(12) United States Patent
Penkovski et al.

(10) Patent No.: US 7,089,340 B2
(45) Date of Patent: Aug. 8, 2006

(54) HARDWARE MANAGEMENT OF JAVA THREADS UTILIZING A THREAD PROCESSOR TO MANAGE A PLURALITY OF ACTIVE THREADS WITH SYNCHRONIZATION PRIMITIVES

(75) Inventors: Vladimir M. Penkovski, Folsom, CA (US); Hsien-Cheng E. Hsieh, deceased, late of Gold River, CA (US); by Candice Huang, legal representative, Rancho Cordova, CA (US)

(73) Assignee: Intel Corporation, Santa Clara, CA (US)

( * ) Notice: Subject to any disclaimer, the term of this patent is extended or adjusted under 35 U.S.C. 154(b) by 393 days.

(21) Appl. No.: 10/335,332

(22) Filed: Dec. 31, 2002
 (Under 37 CFR 1.47)

(65) Prior Publication Data

US 2005/0080962 A1    Apr. 14, 2005

(51) Int. Cl.
 *G06F 13/00* (2006.01)
 *G06F 9/46* (2006.01)
(52) U.S. Cl. ............... 710/200; 710/5; 710/36; 710/107; 709/100; 709/248; 718/106; 718/102
(58) Field of Classification Search ............ 710/5, 710/36, 107, 200; 709/100, 248; 718/102, 718/106
 See application file for complete search history.

(56) References Cited

U.S. PATENT DOCUMENTS

| | | | |
|---|---|---|---|
| 5,828,880 A * | 10/1998 | Hanko | 718/106 |
| 6,044,403 A | 3/2000 | Gerszberg et al. | |
| 6,141,794 A * | 10/2000 | Dice et al. | 717/118 |
| 6,158,048 A | 12/2000 | Luch et al. | |
| 6,167,253 A | 12/2000 | Farris et al. | |
| 6,170,015 B1 | 1/2001 | Lavian | |
| 6,230,311 B1 | 5/2001 | Gerard et al. | |
| 6,247,025 B1 | 6/2001 | Bacon | |
| 6,249,288 B1 * | 6/2001 | Campbell | 345/629 |
| 6,272,674 B1 | 8/2001 | Holiday, Jr. | |
| 6,289,395 B1 | 9/2001 | Apte et al. | |
| 6,292,935 B1 | 9/2001 | Luch et al. | |
| 6,324,688 B1 | 11/2001 | Brown et al. | |
| 6,327,609 B1 | 12/2001 | Ludewig et al. | |
| 6,332,215 B1 | 12/2001 | Patel et al. | |
| 6,401,134 B1 | 6/2002 | Razavi et al. | |
| 6,427,153 B1 | 7/2002 | Nelson et al. | |
| 6,430,564 B1 | 8/2002 | Judge et al. | |
| 6,430,568 B1 | 8/2002 | Hickey et al. | |
| 6,430,570 B1 | 8/2002 | Judge et al. | |
| 6,433,794 B1 | 8/2002 | Beadle et al. | |
| 6,481,006 B1 | 11/2002 | Blandy et al. | |
| 6,507,946 B1 | 1/2003 | Alexander, III et al. | |
| 6,513,158 B1 | 1/2003 | Yogaratnam | |
| 6,567,084 B1 * | 5/2003 | Mang et al. | 345/426 |
| 6,571,389 B1 | 5/2003 | Spyker et al. | |
| 6,826,749 B1 | 11/2004 | Patel et al. | |
| 6,895,575 B1 | 5/2005 | Dharamshi | |
| 2003/0041173 A1 * | 2/2003 | Hoyle | 709/248 |
| 2004/0003018 A1 * | 1/2004 | Pentkovski et al. | 709/100 |

FOREIGN PATENT DOCUMENTS

EP         862113 A2 *    9/1998

* cited by examiner

*Primary Examiner*—Tammara Peyton
(74) *Attorney, Agent, or Firm*—Blakely, Sokoloff, Taylor & Zafman LLP

(57) ABSTRACT

A system for managing threads to handle transaction requests connected to input/output (I/O) subsystems to enable notification to threads to complete operations.

15 Claims, 3 Drawing Sheets

HARDWARE MANAGEMENT OF JAVA THREADS UTILIZING A THREAD PROCESSOR TO MANAGE A PLURALITY OF ACTIVE THREADS WITH SYNCHRONIZATION PRIMITIVES

FIELD OF THE INVENTION

Embodiments of the invention relate to a system for managing threads.

GENERAL BACKGROUND

In computing systems, such as web servers or application servers, threads are used to handle transaction requests. A "thread" is generally defined as a sequence of instructions that, when executed, perform a task. Multiple threads may be processed concurrently to perform different tasks such as those tasks necessary to collectively handle a transaction request. A "transaction request" is a message transmitted over a network that indicates what kind of service is requested. For instance, the message may request to browse some data contained in a database. In order to service the request, the recipient initiates a particular task that corresponds to the nature of the requested task.

One problem associated with conventional computing systems is that a significant amount of processing time is spent by a central processing unit (CPU) on thread management. In general, "thread management" involves management of queues, synchronizing, waking up and putting-to-sleep threads, context switches and many other known functions. For instance, in systems with a very high thread count, on the order of thousands for example, operations of the systems can be bogged down simply due to thread management and overhead, namely the time it takes to process threads.

A proposed solution of reducing the high processing demands is to preclude the use of a large number of threads to handle transaction requests. Rather, single threads or a few threads may be configured to handle such requests. This leads to poor system scalability.

Currently, there are computing systems that have threading control built into the CPU such as a CRAY® MTA™ computer. However, these systems suffer from a number of disadvantages. First, only a maximum of 128 threads are supported per CPU. As a result, support of a larger thread count would need to be implemented in software. Second, integrating circuitry to support up to 128 threads occupies a significant amount of silicon real estate, and thereby, increases the overall costs for the CPU. Third, the threading control hardware of conventional computing systems is stand-alone and is not connected to the rest of the system (e.g., input/output "I/O" circuitry). Since this hardware does not have the proper interface with the rest of the system, true automatic thread management is not provided (e.g., waking up a thread when a "file read" operation that the thread has been waiting on is completed).

BRIEF DESCRIPTION OF THE DRAWINGS

The invention may best be understood by referring to the following description and accompanying drawings that are used to illustrate embodiments of the invention.

DETAILED DESCRIPTION

Certain embodiments of the invention relate to a computing system, co-processor and method for managing threads. For one embodiment of the invention, thread management overhead is off-loaded to specialized hardware implemented in circuitry proximate to a system processor. In another embodiment of the invention, thread management is integrated into the system processor.

Certain details are set forth below in order to provide a thorough understanding of various embodiments of the invention, albeit the invention may be practiced through many embodiments other that those illustrated. Well-known circuitry and operations are not set forth in detail in order to avoid unnecessarily obscuring this description.

Herein, a "computing system" may generally be considered as hardware, software, firmware or any combination thereof that is configured to process transaction requests. Some illustrative examples of a computing system include a server (e.g., web server or application server), a set-top box and the like.

A "thread" is a sequence instructions that, when executed, perform one or more functions or tasks. The threads may be stored in a processor-readable medium, which is any medium that can store or transfer information. Examples of "processor-readable medium" include, but are not limited or restricted to a programmable electronic circuit, a semiconductor memory device, a volatile memory (e.g., random access memory, etc.), a non-volatile memory (e.g., read-only memory, flash memory, etc.), a floppy diskette, an optical disk such as a compact disk (CD) or digital versatile disc (DVD), a hard drive disk, or any type of communication link.

Figure 1:
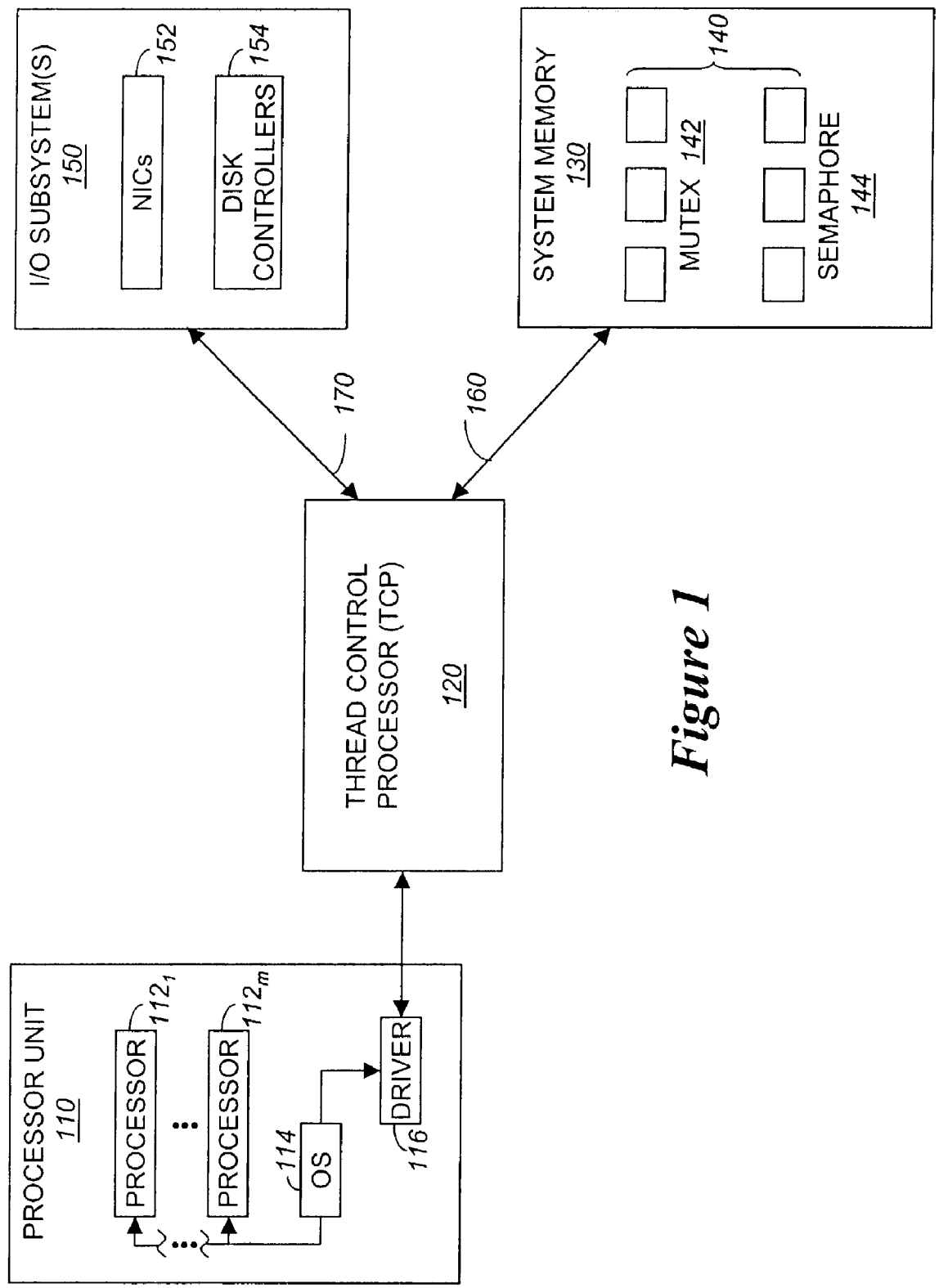
FIG. 1 is a first exemplary diagram of a computing system featuring a thread control processor (TCP)

Referring to FIG. 1, an exemplary diagram of a computing system 100 is shown. The computing system 100 comprises a processor unit 110, a thread control processor (TCP) 120, a system memory 130, synchronization primitives 140 and one or more I/O subsystems 150.

As shown in this embodiment of the invention, processor unit 110 comprises one or more (M) processors $112_1$–$112_M$. The particular number "M" of processors forming processor unit 110 is optimized on the basis cost versus performance. For simplicity in the present description, two processors $112_1$ and $112_M$ are illustrated. An operating system (O/S) 114 is accessible to processors $112_1$ and $112_M$ and uses a driver 116 to communicate with TCP 120.

Each "processor" represents a central processing unit (CPU) of any type of architecture, such as complex instruction set computers (CISC), reduced instruction set computers (RISC), very long instruction word (VLIW), or hybrid architecture. Of course, a processor may be implemented as an application specific integrated circuit (ASIC), a digital signal processor, a state machine, or the like.

Figure 2:
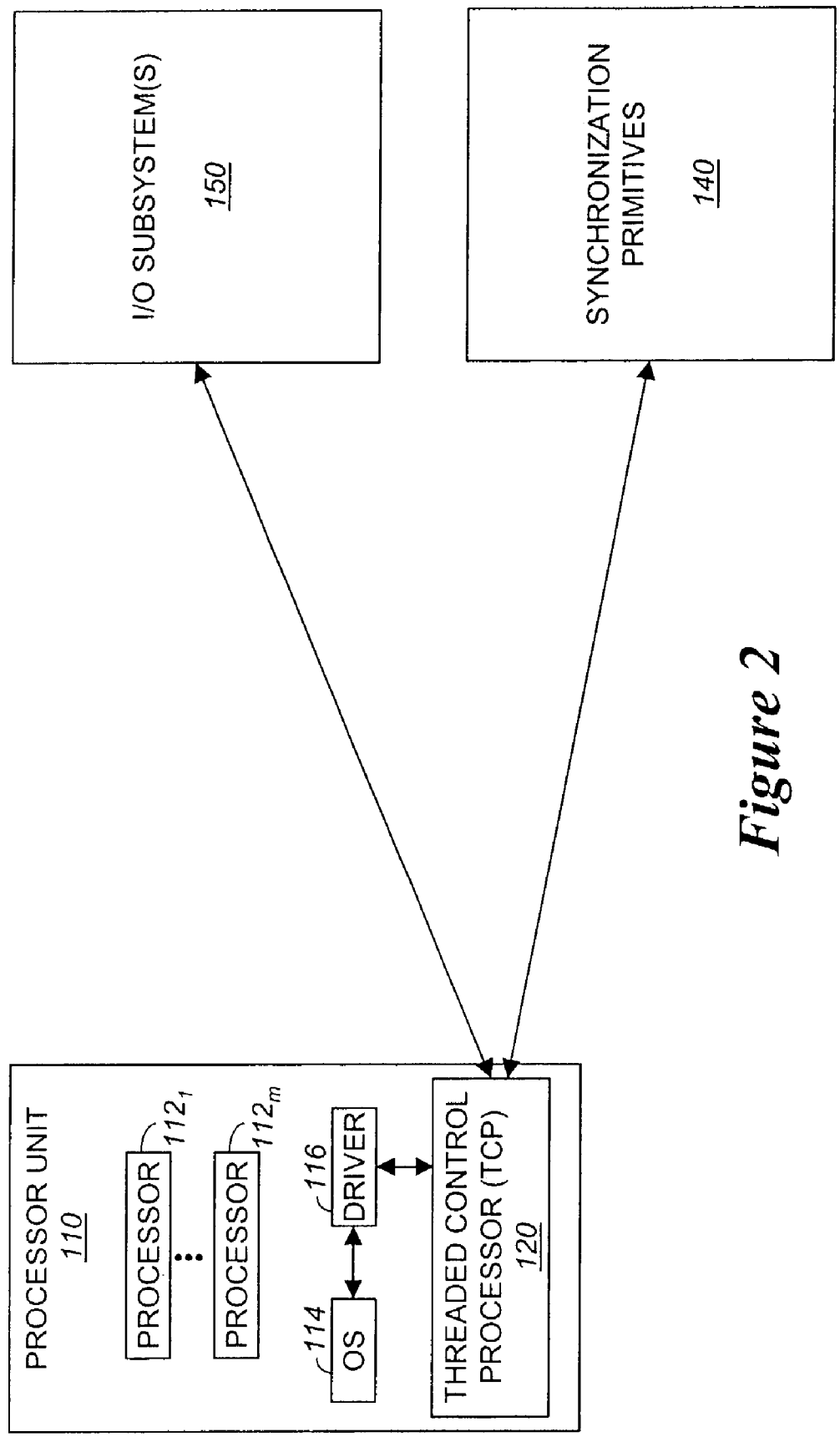
FIG. 2 is a second exemplary diagram of a computing system featuring the TCP.

As shown in FIG. 1, processor unit 110 is in communication with TCP 120. TCP 120 may be implemented as (i) a co-processor (as shown) separately positioned on a circuit board featuring processor unit 110 or (ii) additional circuitry implemented either on the same integrated circuit chip of a processor (e.g., processor $112_1$) or on a separate integrated circuit chip within the same processor package (see FIG. 2).

TCP 120 is responsible for maintaining threads (e.g., JAVA® threads) operating within the computing system 100. For instance, TCP 120 performs wake-up and put-to-sleep, thread scheduling, event notification and other miscellaneous tasks such as queue management, priority computation and other like functions. Interconnects 160 and 170 are provided from the TCP 120 to synchronization primitives 140 and I/O subsystems 150, respectively.

For this embodiment of the invention, I/O subsystems 150 comprise networking network interface controllers (NICs) 152 and disk controllers 154. These I/O devices may be configured to communicate with TCP 120.

Herein, embodied in hardware or software, synchronization primitives 140 include a mutual exclusion object (Mutex) 142 and/or a Semaphore 144. Both of these primitives are responsible for coordinating the usage of shared resources such as files stored in system memory 130 or operating system (OS) routines.

In general, Mutex 142 is a program object created to enable the sharing of the same resource by multiple threads. Typically, when a multi-threaded program is commenced, it creates a mutex for each selected resource. Thereafter, when a thread accesses a resource, a corresponding mutex is configured to indicate that the resource is unavailable. Once the thread has concluded its use of the resource, the mutex is unlocked to allow another thread access to the resource.

Similar in purpose to Mutex 142, Semaphore 144 is a variable with a value that indicates the status of a shared operating system (OS) resource. Hence, Semaphore 144 is normally located in designated place in operating system (or kernel) storage.

Figure 3:
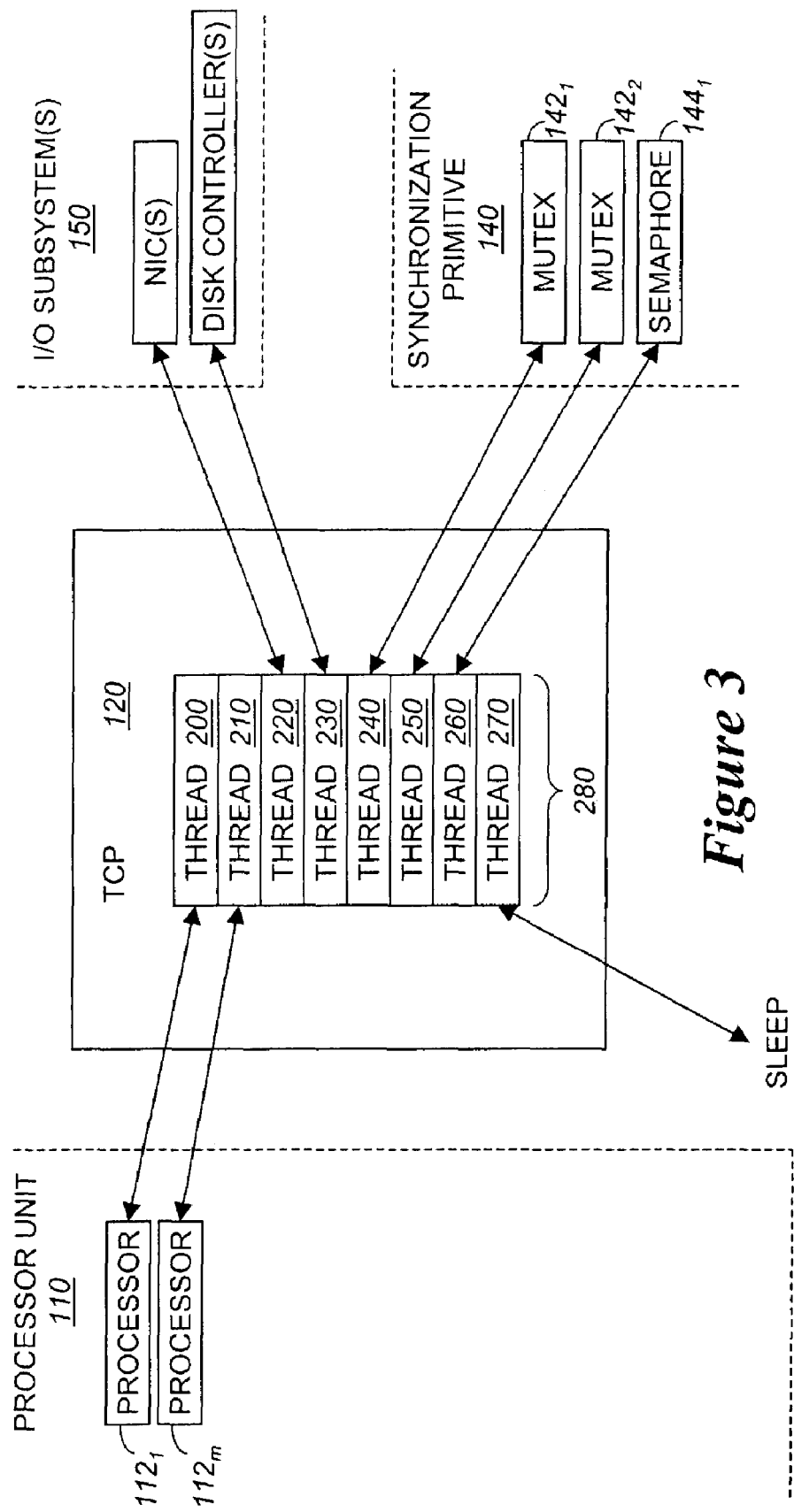
FIG. 3 is an exemplary block diagram illustrating operations of the TCP.

Referring now to FIG. 3, an exemplary block diagram illustrating operations of the TCP 120 is shown. The TCP 120 manages all active threads in the computing system 100. For simplicity in illustration, eight (8) threads 200, 210, 220, 230, 240, 250, 260 and 270 (generally referred to as "thread(s) 280") are illustrated.

In practice, however, thousands of threads may be utilized. The threads may be in either a RUN state, a WAIT state or a SLEEP state. For instance, threads existing in a RUN state and loaded in processor unit 110 include threads 200 and 210.

Other threads may be existing in a WAIT state such as threads 220 and 230 waiting on an I/O event within any of the I/O subsystems 150. Hence, the TCP 120 supports automatic event notification, which allows signals to notify the TCP 120 about I/O events such as completion of a file read operation, completion of transmission of a message over a network via NIC and the like.

Also, threads 240, 250 and 260 may also exist in a WAIT state by waiting on synchronization primitives such as Mutex 142$_1$, Mutex 142$_2$ and/or Semaphore 144$_1$. Alternatively, a thread such as thread 270 may simply be in a SLEEP state.

As indicated upon, any thread 280 is placed in a RUN state when one of a number of conditions is satisfied. For instance, a thread 280 is ready-to-run when an I/O event that the thread is waiting on is completed. Alternatively, a thread 280 is ready-to-run when a synchronization primitive 140 that the thread 280 is waiting on is triggered. Yet another example is that a thread 280 is ready-to-run when it is awoken from a SLEEP state. The TCP 120 selects threads in a RUN state (i.e., ready-to-run threads) and provides them to one of the available processor 112$_1$–112$_M$ in the processor unit 110 for execution.

In case of multiple threads in a RUN state being available, a priority-based scheduler (not shown) can be used to select one of the threads based on the chosen priority rules. Other scheduling algorithms such as the well-known round-robin technique can be used. Threads are placed into a SLEEP state when either time quanta expires or threads request an I/O operation from an I/O device.

In general, TCP 120 can support multiple threading models. For example, JAVA® Threads or native operating system threads operate in accordance with embodiments of the invention. However, JAVA® threads are one preferred target for the TCP 120 because of their widespread use in current systems.

In an embodiment where the TCP 120 is a separate co-processor, the TCP 120 may reside on a circuit board. Lower cost is enabled since the separate processor can use older technology and support a high number of threads. Thus, for the embodiment of FIG. 1, thread management hardware can be coupled directly to each of the I/O subsystems 150 and enable automatic event notification to threads such as completion of a file read operation. In contrast, traditional threading control hardware deals with threading control only.

While the invention has been described in terms of various embodiments, the invention should not limited to only those embodiments described, but can be practiced with modification and alteration within the spirit and scope of the appended claims. The description is thus to be regarded as illustrative instead of limiting.

What is claimed is:

1. A computing systems comprising:
  a memory to contain a synchronization primitive;
  an input/output (I/O) subsystem including at least one I/O device;
  a processing unit to process a control thread; and
  a thread control processor coupled to the processing unit, the thread control processor to exclusively manage a plurality of active threads and to communicate with (i) the synchronization primitive via a first interconnect for coordinating usage of a shared resource by the plurality of active threads and (ii) the I/O device via a second interconnect to receive information when an I/O event by the I/O device has completed.

2. The computing system of claim 1, wherein the synchronization primitive comprises one of a mutual exclusion object (Mutex) and a Semaphore residing in the memory.

3. The computing system of claim 1, wherein the I/O device is a disk controller.

4. The computing system of claim 3, wherein the I/O event is a file read operation being completed.

5. The computing system of claim 1, wherein the I/O device is a network interface controller.

6. The computing system of claim 1, wherein the I/O event is a transmission of a message onto a network via the network interface controller.

7. A method comprising
  implementing a thread control processor in a computing system;
  interconnecting the thread control processor to an input/output (I/O) device and to a system memory loaded with at least one synchronization primitive;
  exclusively managing a plurality of active threads by the thread control processor of the computing system; and
  communicating by the thread control processor with the I/O device via a first interconnect to receive information when an I/O event by the I/O device has completed.

8. The method according to claim 7, wherein the exclusive managing of the plurality of active threads comprises maintaining threads until they become ready-to-run and connecting threads for operation when ready-to-run.

9. The method according to claim 8, wherein the exclusive managing of the plurality of active threads further comprises selecting ready-to-run threads and connecting them to available processing resources.

10. The method of claim 8 further comprising:
communicating by the thread control processor with the synchronization primitive via a second interconnect.

11. A computing system comprising:
a processing unit to process a control thread; and
a thread control processor coupled to the processing unit, the thread control processor to exclusively manage a plurality of active threads and to communicate with (i) a synchronization primitive via a first interconnect for coordinating usage of a shared resource by the plurality of active threads and (ii) an input/output (I/O) device via a second interconnect to receive information when an I/O event by the I/O device has completed.

12. The computing system of claim 11, wherein the synchronization primitive is stored in a memory and comprises one of a mutual exclusion object (Mutex) and a Semaphore residing in the memory.

13. The computing system of claim 11, wherein the I/O device is one or a disk controller and a network interface controller.

14. The computing system of claim 11, wherein the I/O event is a file read operation being completed.

15. The computing system of claim 13, wherein the I/O event is a transmission of a message onto a network via the network interface controller.

* * * * *